United States Patent Office 3,474,244
Patented Oct. 21, 1969

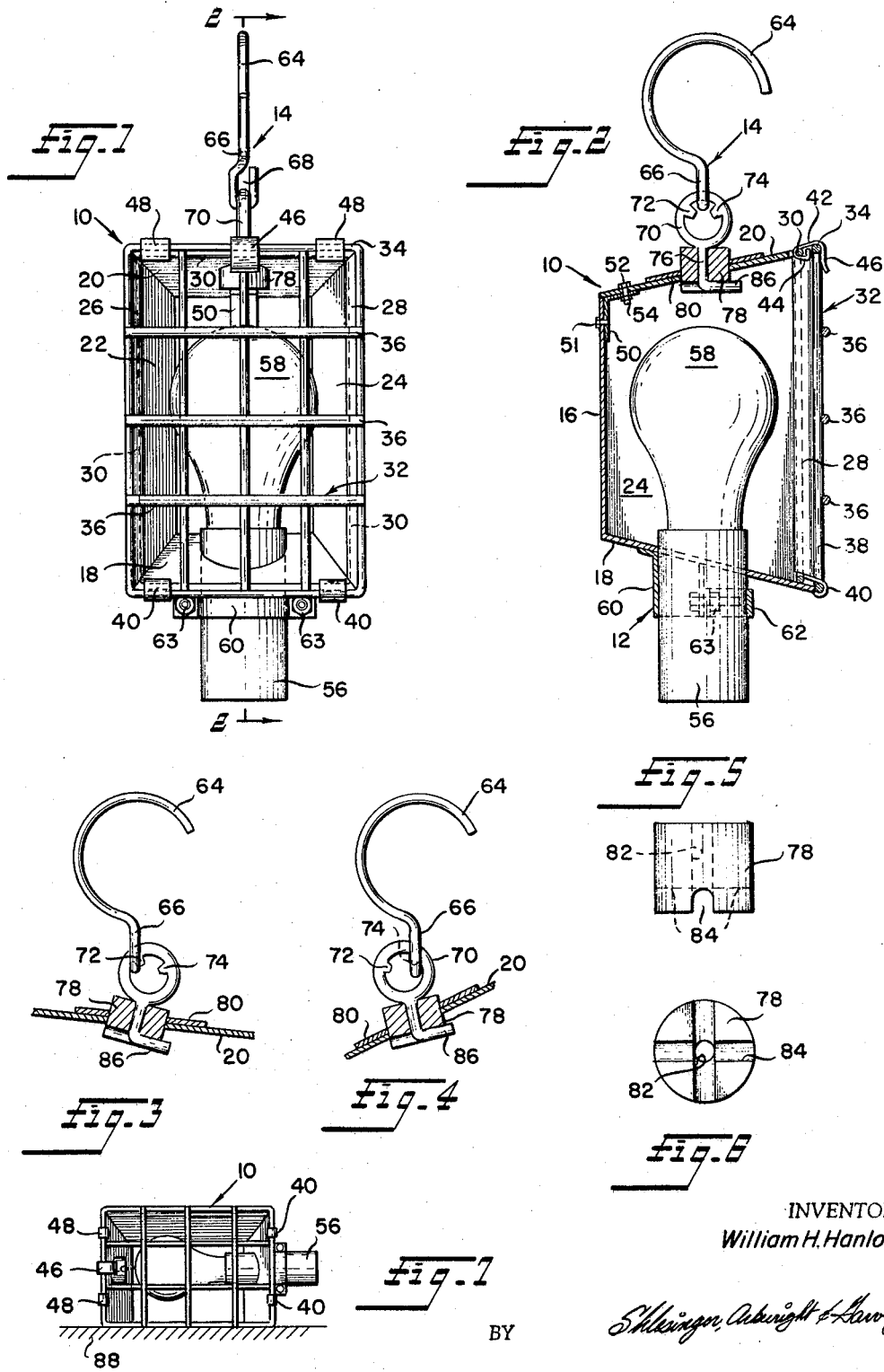

3,474,244
TROUBLE LIGHT ASSEMBLY
William McKinley Hanlon, P.O. Box 1724,
Billings, Mont. 59103
Filed Feb. 23, 1967, Ser. No. 618,026
Int. Cl. F21l 1/00
U.S. Cl. 240—11.2                  3 Claims

ABSTRACT OF THE DISCLOSURE

A trouble light assembly embodying a light cage and reflector of trough shape. The reflector has five substantially flat wall members and a reticulate guard over the remaining side of the trough. A hook member is provided which extends from one wall of the cage. One end of the hook member is bent for selective engagement with complemental grooves in the cage for adjustment thereof, to throw light in different directions in a horizontal plane. The hook member also has an intermediate ring with spaced internally directed protrusions permitting engagement of the upper end of the hook member with different portions of the ring periphery to effect adjustment of the trouble light assembly in a vertical plane.

---

This invention relates to a trouble light assembly which is readily adaptable for selectively shining light in different directions, the assembly being suspended or supported by a planar surface, as desired.

OBJECTS AND SUMMARY

It is an object of this invention to provide a trouble light assembly including a combination cage and reflector of trough shape having substantially flat walls, the cage being adapted for placement on a planar surface in a manner to direct light upwardly, downwardly or outwardly therefrom without danger of accidental movement thereof once the cage has been positioned.

Another object is to provide a trouble light assembly having a cage, and a suspension unit issuing from an end wall of the cage, the suspension unit including a swivel hook for attachment to a stationary object, the suspension unit being further provided with means for adjusting the cage in horizontal and vertical planes, and means for retaining the cage in position once it has been positioned, to throw light in the desired direction.

A further object is to provide a trouble light assembly of the character described wherein a portion of the swivel hook is selectively engaged with complemental receiving portions of the cage for fixedly retaining the cage in position.

A further object is to provide a hook member including a circular ring having spaced internally directed protuberances, a portion of the hook being adapted to engage different portions of the ring periphery and be held by the protuberances, to effect adjustment of the cage in a vertical plane.

A still further object is to provide a trouble light assembly of the character described which may be economically manufactured and assembled, and which is readily adaptable for shining light in a given area.

In general, the invention provides a trouble light assembly embodying a cage having substantially flat reflective walls to permit the cage to be placed on a planar surface with the walls selectively engaged with the surface to shine light in different directions. The assembly further contemplates the provision of a suspension unit for hanging the assembly from a support, the unit having means for adjusting the position of the cage in both a horizontal and vertical plane and for retaining the cage in the adjusted positions.

Other objects will be manifest from a further consideration of the drawing taken in conjunction with the detailed description wherein:

FIGURE 1 is a front elevational view of the trouble light assembly of the present invention, illustrating the position of use thereof when suspended;

FIGURE 2 is a sectional view taken along the line 2—2 of FIGURE 1 looking in the direction of the arrows;

FIGURE 3 is a fragmentary view similar to FIGURE 2, showing to advantage an alternate position of the suspension unit;

FIGURE 4 is a view similar to FIGURE 3, showing another alternate position of the suspension unit;

FIGURE 5 is an elevational view of an adjustment member forming a part of the present invention;

FIGURE 6 is a bottom plan view of the same, and

FIGURE 7 is a view similar to FIGURE 1, illustrating the use of the present assembly support on a planar surface.

Referring now in greater detail to the drawing, the trouble light assembly of the present invention generally includes a cage and reflector 10 within which is an illuminating source 12, the cage being provided with a suspension unit indicated at 14.

As shown to advantage in FIGURES 1 and 2, cage and reflector 10 includes a trough-like member comprising a rear wall 16 from which end walls 18 and 20 and side walls 22 and 24 extend outwardly in sloping relationship. In accordance with the objects of the present invention, the walls are preferably of solid metallic construction having reflective properties.

The outer limits of side walls 22 and 24 are bent inwardly to form flanges indicated at 26 and 28. A wire frame 30 of rectangular confirmation is interposed between flanges 26 and 28 and side walls 22 and 24 respectively and is held in position thereby.

A reticulate member 32 is positioned over the open front portion of the cage and reflector to protect illuminating source 12. Reticulate member 32 includes a rectangular frame 34 between the sides of which are a plurality of spaced transverse members 36 and spaced longitudinal members 38, all of which are secured to frame 34. In order to hold the reticulate member 34 in position, end wall 18 is extended to provide flanges 40 which are wrapped around the adjacent portion of frame 34 and bent rearwardly into engagement with frame 30 and the main body portion of end wall 18. This permits hinged movement of reticulate member 32. In this connection, there is also provided a clip member 42 which is centrally mounted on the upper cross member of frame 30, the clip member being provided with a terminal portion 44 which is bent around the frame to hold the clip in engagement with the frame. Clip member 42 is further provided with a finger-engaging spring portion 46 adapted for frictional engagement over the adjacent portion of reticulate member 32 to hold the latter in operative position while the assembly is being used.

It is further within the contemplation of the present invention to hinge end wall 20 to permit opening of the cage for removal and replacement of an illuminating bulb therein. For this purpose, the forward portion of end wall 20 is provided with extensions 48 which are bent over the adjacent portion of frame 30 and then directed rearwardly against the inner face of the end wall, thereby forming a hinge on which the end wall swings. In order to normally hold the end wall in its operative position, there is provided an angular strap 50, one portion of which is fixed at 51 to rear wall 16 near the upper limit thereof, the other portion of the angular strap being contiguous with the underface of end wall 20. A bolt or the like 52 extends through end wall 20 and that portion of strap 50 proximate the end wall and is in threaded engagement with a nut 54 fixed to strap 50 for locking end wall in position.

Illuminating source 12 includes a socket 56 which extends through end wall 18 and is adapted to receive a light bulb 58 which is screwed into the socket. A combination plate and clamp 60 is fixed in any suitable manner to end wall 18, the clamp portion thereof being adapted to co-act with a collar portion 62 which is removable bolted at 63 to the combination plate and clamp for holding socket 56 in operative position.

Suspension unit 14 includes a hook or bill 64 which issues into a shank 66 having an elongated central slot 68. A circular ring 70 extends through slot 68 and is suspended from the hook and bill portion of the suspension unit. Ring 70 is provided with a pair of spaced inwardly-directed protuberances 72 and 74 for purposes which will be hereinafter more fully set out. A shank 76 issues from circular ring 70 at its lowest extremity, which shank extends through an adjustment member 78 carried by a mounting plate 80 which is fixedly secured to the central portion of end wall 20.

As shown to advantage in FIGURES 5 and 6, adjustment member 78 includes a central bore 82 of substantially the same diameter as shank 76. Semi-circular recesses 84 extend radially outwardly from the lower portion of adjustment member 78 and in communication with bore 82, which recesses are adapted for selective reception of a right angle terminal portion 86 of shank 76.

OPERATION

In use, the trouble light assembly of the present invention may be employed in the manner illustrated in FIGURE 7 laid directly on a table 88 or other planar surface, the trough-like shape of the cage and reflector with its substantially flat walls preventing accidental rolling or other movement of the assembly, so that the light therefrom may be directed upwardly, downwardly or outwardly, as desired.

When the trouble light assembly of the present invention is to be suspended from a fixed object, hook or bill 64 is engaged with the object in an obvious manner. By selectively engaging right angle portion 86 with any one of the semi-circular recesses 84 of adjustment member 78, the light may be directed in a horizontal plane through an angle of 360 degrees. With the assembly of the present invention, the light may be also adjusted in a vertical plane in the manner illustrated to advantage in FIGURES 3 and 4. If it is desired to shine the light downwardly then bill 64 is moved relative to ring 70 until shank 66 thereof engages the inner periphery of the ring at a point approximately 90 degrees from the normal position shown in FIGURE 2. Shank 66 is held in this position by protuberances 72.

If the light is to be directed upwardly, then bill 64 and ring 70 are moved relative to one another, in the manner shown in FIGURE 4, shank 66 being held in this position by protuberances 74.

In order to replace light bulb 58, bolt 52 is removed, thereby permitting end wall 18 to be swung upwardly about extension hinges 48, to afford easy access to the light bulb.

The trouble light assembly of the present invention, therefore, is readily adaptable for use both suspended and unsuspended and in both positions may be readily adjusted to direct light in the desired direction. The area of light directed on the object to be illuminated may be adjusted by moving the light closer or farther away until the desired effect is obtained.

When suspension unit 14 is employed, means are provided for adjustment of the trouble light assembly in both a horizontal and vertical plane. In all positions of adjustment, retaining members hold the trouble light assembly in the set position until it is desired to change to an alternate position.

The trouble light assembly of the present invention, although providing means for effecting a number of alternative positions of adjustment, is of simple construction which may be economically manufactured and assembled without the use of expensive or exotic parts.

While there has been herein shown and described the presently preferred form of the present invention, it is to be understood that this has been done for purposes of illustration only, and that various changes may be made therein within the scope of the claims hereto appended.

I claim:

1. In a trouble light assembly having a cage and a light source within the cage, a suspension unit for the cage including:
   (a) a hook member having
   (b) a shank issuing therefrom,
   (c) the terminal of the shank being bent at substantially a right angle to the shank,
   (d) an adjustment member mounted on, and extending into the cage,
   (e) said adjustment member having a bore through which the shank extends,
   (f) said adjustment member having a plurality of recesses radiating from the bore adapted for selective reception of the bent portion of the shank, to effect swivel adjustment of the hook member to different positions with respect to the cage.

2. The suspension unit of claim 1, with the addition of:
   (a) intermediate adjusting means interposed between the hook member and the adjustment member,
   (b) said intermediate adjusting means including a ring,
   (c) spaced protuberances extending inwardly from the inner periphery of said ring,
   (d) said hook member being provided with an elongated opening through which said ring passes,
   (e) said hook member being selectively engaged with said ring at various points along its periphery and retained in position by said protuberances.

3. A trouble light assembly comprising:
   (a) a cage and reflector of trough-like construction embodying,
   (b) a rear wall,
   (c) sloping side and end walls extending forwardly and outwardly from said rear wall, said walls being substantially flat,
   (d) a reticulate member over the open front of the cage and reflector,
   (e) an illuminating source within said cage and reflector, and
   (f) a suspension unit connected to an end wall of said cage and reflector, said suspension unit including
   (g) a hook,
   (h) a shank issuing from said hook,
   (i) said shank being provided with an elongated longitudinal recess,
   (j) a ring extending through the longitudinal recess of said ring, (k) spaced protuberances extending inwardly from the inner periphery of said ring,
(l) a shank issuing from the lower extremity of said ring,
(m) an adjustment member fixedly mounted in a wall of said cage and reflector,
(n) and having a bore through which said shank issuing from the ring extends,
(o) said adjustment member having a plurality of semi-cylindrical recesses extending outwardly from the bore thereof,
(p) the lower terminal of said shank of the ring being bent at a right angle for selective engagement with the recesses of said adjustment member.

References Cited

UNITED STATES PATENTS

| | | | |
|---|---|---|---|
| 907,613 | 12/1908 | La Vine | 240—11.2 |
| 2,004,183 | 6/1935 | Benjamin | 240—11.2 |
| D. 141,063 | 5/1945 | Kiplock | 240—11.2 |
| 2,803,742 | 8/1957 | Bellamy | 240—88 |

NORTON ANSHER, Primary Examiner

R. P. GREINER, Assistant Examiner

U.S. Cl. X.R.

240—8.18; 248—339